United States Patent Office.

WILLIAM J. RAND, OF BROOKLYN, E. D., NEW YORK.

Letters Patent No. 93,478, dated August 10, 1869.

IMPROVED MANUFACTURE FROM ICELAND MOSS AND CARRAGEEN.

The Schedule referred to in these Letters Patent and making part of the same.

To all whom it may concern:

Be it known that I, WILLIAM J. RAND, of the Eastern District of the city of Brooklyn, county of Kings, and State of New York, have invented a new and useful Process of Preparing Iceland Moss and Carrageen, known in commerce as Irish moss, for making *blanc-mange* and other edible dishes, which constitutes a new manufacture; and I hereby declare that the following is a full, clear, and exact description of the same.

Iceland moss and carrageen are now used for making *blanc-mange*, puddings, and other articles of dessert, and are considered very wholesome and highly-nutritious articles of diet, and easy of digestion. They are regarded by physicians as articles of great medicinal value, and are recommended for invalids and convalescents, as well as to those who would preserve their health.

For making *blanc-mange, Charlotte-Russe,* and snow-pudding, these mosses are unrivalled by their various modern competitors for public favor, namely, gelatine, farina, and corn-starch, for the reason that the gelatine contains little or no nutriment, and farina and corn-starch contain no element of any note except starch, while the mosses contain nearly seventy-nine per cent. of pectine, and liberal supplies of sulphur, chlorine, bromine, iodine, and oxalate of lime, and are distinguished from gum, by affording, when dissolved in water, no precipitate with alcohol, and from starch, by not becoming blue with tincture of iodine.

The moss grows on or near the rocks by the sea-shore, and when it is gathered it is covered with pebbles, sand, muscles, small shells, and dirt, which it retains with great tenacity, its nature being gelatinous. On this account it has been almost excluded from the table as an article of diet, and its commercial value materially impaired. The great desideratum for this article has been proper cleaning and preparation for cooking. The moss is very bulky, and has heretofore been sold by grocers and druggists, by the pound, and has never been put up in suitable form and quantities for the convenience of the consumer and the trade.

My invention consists of cleaning and preparing it, and packing it in papers or boxes, or pressed into cakes.

The process which I have successfully employed is as follows:

I take the crude moss, and remove, by hand or suitable machinery, all the pebbles, muscles, small shells, sand, and dirt, and put it up in packages suitable for the consumer and the trade.

Having thus described my process, I desire to state that I do not claim any definite mode or form of putting up the moss; but

What I do claim, and desire to secure by Letters Patent, is—

Iceland moss and carrageen, cleansed and put up in suitable packages or boxes for the consumer and the trade, as a new commercial article.

WM. J. RAND.

Witnesses:
OSCAR COMSTOCK,
THOMAS TIBBALL.